UNITED STATES PATENT OFFICE.

GEORGE W. BEDBURY, OF ALAMEDA, AND EUGENE F. BADGLEY, OF SAN FRANCISCO, CALIFORNIA; SAID BEDBURY ASSIGNOR TO SAID BADGLEY.

COMPOSITION OF MATTER FOR WATER-PIPES.

SPECIFICATION forming part of Letters Patent No. 506,356, dated October 10, 1893.

Application filed March 16, 1891. Serial No. 385,305. (No specimens.)

*To all whom it may concern:*

Be it known that we, GEORGE W. BEDBURY, residing at Alameda, Alameda county, and EUGENE F. BADGLEY, residing in the city and county of San Francisco, State of California, citizens of the United States, have invented a new and useful Composition of Matter to be Used for the Manufacture of Pipes for Conducting Water, of which the following is a specification.

Our composition consists of the following ingredients combined in the proportions stated, viz: asphaltum or bitumen, twenty-three per cent.; pulverized clay, forty per cent.; magnesia, thirty per cent.; asbestus, seven per cent.

It will be necessary to subject the asphaltum or bitumen to such a degree of heat as shall be required to evaporate all moisture therefrom, as well as such oily matter as may be contained therein.

It has been discovered that oil remaining in asphaltum or bitumen has a tendency to soften it, making it unable to withstand the atmospheric or other heat to which it may be subjected. As the composition above named will be largely used in the manufacture of pipe for water, drain, sewer, irrigation and other commercial commodities, such as artificial piles, pile armor or pile casing, flower pots, bath tubs, wash sinks, burial caskets and cases and other articles which it may be suitable for; thus it is essential to rid the asphaltum or bitumen of such matter as may incline it to softness.

After the asphaltum or bitumen shall have been prepared as above, the pulverized clay, magnesia and asbestus must be heated to 300° or 350° Fahrenheit, and then added to the asphaltum or bitumen and the whole then thoroughly mixed. It will then be ready for the molds or machinery of manufacture.

The use of clay in this composition provides body to the same. It readily fuses with the other component parts and thereby aids the asphaltum or bitumen to withstand heat.

Combining the magnesia with the asbestus, or hornblend rock, a cement is obtained which in conjunction with the other ingredients gives enormous tensile strength.

What we claim, and desire to secure by Letters Patent of the United States, is—

The herein described composition of matter consisting of asphaltum or bitumen, pulverized clay, magnesia and asbestus in the proportions, substantially as specified.

GEORGE W. BEDBURY. [L. S.]
EUGENE F. BADGLEY. [L. S.]

Witnesses:
G. A. REYNOLDS,
ALVAN FLANDERS.